Oct. 29, 1929.  A. A. ANDRAKE  1,733,770
METHOD OF MANUFACTURING COWLINGS
Filed Feb. 15, 1928
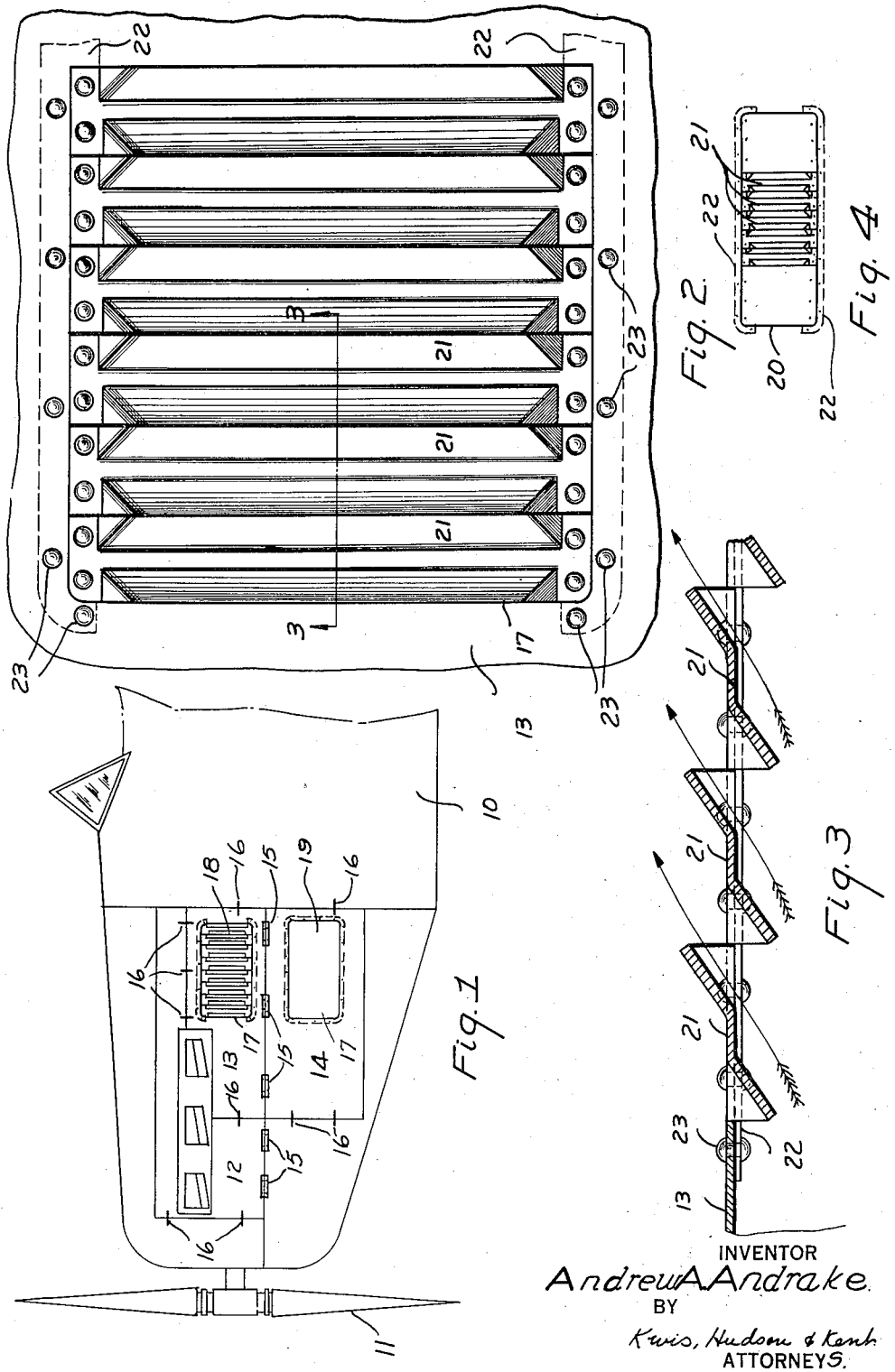
INVENTOR
Andrew A. Andrake.
BY
Kwis, Hudson & Kent
ATTORNEYS.

Patented Oct. 29, 1929

1,733,770

UNITED STATES PATENT OFFICE

ANDREW A. ANDRAKE, OF CLEVELAND, OHIO, ASSIGNOR TO THE GLENN L. MARTIN COMPANY, OF BALTIMORE, MARYLAND, A CORPORATION OF OHIO

METHOD OF MANUFACTURING COWLINGS

Application filed February 15, 1928. Serial No. 254,343.

This invention relates to a method of manufacturing cowlings for aircraft engines.

Cowlings for aircraft engines are usually fabricated from an aluminum alloy in sheet metal form in order to obtain a high strength-weight ratio. Such cowlings have to withstand heavy air pressures encountered in flight at high speeds, the conditions on this account being very different from those met with in automobile practice. Another consideration which has to be taken into account in the manufacture of these cowlings is that the conditions of use affect materially the requirements in so far as the amount of louvre ventilation is concerned. A plane intended for use in a warm climate should have a considerably greater area of louvres than one which is to be used in a temperate climate, and a plane which is to go into a cold climate may need very little ventilation in the cowling. In order to meet the requirements of light weight and strength it is common practice in the industry to manufacture the engine cowlings of heat treated aluminum alloy, such as duralumin. The sheet metal from which portions of the cowling in which the louvres have heretofore been integrally formed was heat treated at a specified temperature, cooled to atmosphere, fabricating operations thereafter expedited while the metal is relatively soft but in process of age hardening peculiar to duralumin. The process is not well adapted to the subsequent installation of special louvre equipment to meet changed conditions of service.

One of the objects of my invention, therefore, is the provision of a method of manufacture which will simplify the steps in the fabrication of those portions of the cowlings in which the louvres are to be located.

Another object is the provision of a method of manufacture which shall render it possible and practicable to outfit a given airship with cowling having ventilator louvres of an area such as to give the greatest efficiency under the conditions of use for which the ship is intended, and to permit changing this area later on in case changes become desirable.

Other objects and features of novelty will appear as I proceed with the description of that embodiment of the invention which, for the purposes of the present application, I have illustrated in the accompanying drawing, in which:

Fig. 1 is a side elevational view of the forward portion of an airplane fuselage illustrating a cowling manufactured in accordance with the invention;

Fig. 2 is an enlarged view of a portion of the louvre unit illustrated in Fig. 1;

Fig. 3 is a cross sectional view taken on line 3—3 Fig. 2; and

Fig. 4 is an elevational view of a modified louvre unit.

In the drawing, the fuselage of an airplane is indicated at 10 and the propeller at 11. The propeller is driven by an internal combustion engine, not shown, which is mounted in the fuselage. Surrounding the engine is the engine cowling which is usually constructed in sections, both for manufacturing reasons and for the convenience of mechanics and pilots in working upon or inspecting the engine. In the drawing several of these sections are shown at 12, 13 and 14. In the present instance they are mounted to swing upon hinges 15. Latches, diagrammatically illustrated at 16, may be employed for holding the various sections in closed position.

As above stated, the sheet metal of which the cowling and other parts of the plane are ordinarily constructed, is heat treated and then age hardened during and after fabrication. As it cannot be pressed into louvre units in such hardened condition, it is necessary to again heat treat those sections of the cowling in which the louvres are located before alteration or replacement of the louvres can be proceeded with.

In accordance with my invention the reworking of the cowling sections is dispensed with. The louvre sections of the cowling are produced from heat treated metal and are provided with one or more openings 17 of a uniform size. Louvre units 18 are made up to fit these openings. Panels 19 are also provided to fit the openings, and I may further provide units 20 made up of panel and louvre parts in any desired proportion, one example of which is illustrated in Fig. 4. In this manner any desired area of louvres within the limits provided may be suppled and mounted in an airship at the time of its manufacture, and later on substitutions of louvre and panel units may be made one for the other should it become desirable to change the ventilation of the cowl.

In forming the louvre units I employ individual louvre slats 21 stamped out of strip or sheet material, and rivet these slats at their ends to straps 22, thereby forming an assembled unit. The material of which the slats 21 are to be formed is heated to the requisite heat treating temperature, in accordance with one of the formulæ known to those skilled in the art. The slats are immediately cut and formed from the heat treated material, then assembled with the straps 22 to form a louvre unit before age hardening has been completed. The units may be attached to the cowl sections within the openings 17 by any suitable means, the rivets 23 being illustrated for that purpose as they constitute means for producing joints that tend to remain tight and because they can be drilled out and removed quite readily when necessary without, however, inviting manipulation by inexperienced or unauthorized persons.

Louvre units composed of slats and straps riveted together are not subject to development of cracks as when formed in one piece of sheet metal or when formed in the cowling section.

Having thus described my invention, I claim:

1. A method of manufacturing aircraft engine cowlings, which comprises heat treating sheet metal, forming such metal into cowlings, cutting openings in said cowlings, making up louvre ventilator units to fit said openings, and mounting said units in said openings.

2. A method of manufacturing aircraft engine cowlings, which comprises heat treating sheet metal, forming such metal into cowlings, cutting openings in said cowlings, making up from heat treated metal in a relatively soft condition louvre ventilator units to fit said openings, age hardening the metal of said units during the course of their manufacture, and mounting said units in said openings.

3. A method of manufacturing aircraft engine cowlings which comprises heat treating sheet metal, forming such metal into cowlings, cutting openings in said cowlings, heating strip metal, making up louvre ventilator slats individually from said heated strip metal, assembling said slats into units to fit said openings, and mounting said units in said openings.

4. A method of manufacturing engine cowlings which comprises heat treating sheet metal, forming such metal into cowlings, cutting openings in said cowlings, making up from heat treated sheet metal louvre ventilator units to fit said openings, said processes proceeding during a portion of the age hardening period of the metal, and mounting said units in said openings in said cowlings.

In testimony whereof, I hereunto affix my signature.

ANDREW A. ANDRAKE.